US010459673B2

(12) United States Patent
Someya

(10) Patent No.: US 10,459,673 B2
(45) Date of Patent: Oct. 29, 2019

(54) PRINT CONTROL DEVICE, PRINT SYSTEM, AND PRINT CONTROL METHOD

(71) Applicant: Seiko Epson Corporation, Tokyo (JP)

(72) Inventor: Tomohito Someya, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/315,075

(22) PCT Filed: Jun. 4, 2015

(86) PCT No.: PCT/JP2015/002821
§ 371 (c)(1),
(2) Date: Nov. 30, 2016

(87) PCT Pub. No.: WO2015/186361
PCT Pub. Date: Dec. 10, 2015

(65) Prior Publication Data
US 2017/0192728 A1   Jul. 6, 2017

(30) Foreign Application Priority Data

Jun. 5, 2014 (JP) ................................. 2014-116707
Mar. 24, 2015 (JP) ................................. 2015-060727

(51) Int. Cl.
*G06F 3/12* (2006.01)
*G07G 1/00* (2006.01)

(52) U.S. Cl.
CPC .......... *G06F 3/1298* (2013.01); *G06F 3/1206* (2013.01); *G06F 3/1209* (2013.01); *G06F 3/1232* (2013.01); *G06F 3/1236* (2013.01); *G06F 3/1284* (2013.01); *G06F 3/1285* (2013.01); *G06F 3/1293* (2013.01); *G07G 1/0009* (2013.01); *G06F 3/1247* (2013.01)

(58) Field of Classification Search
USPC ................................. 358/1.1–3.29, 1.11–1.18
See application file for complete search history.

(56) References Cited

U.S. PATENT DOCUMENTS 7,464,333 B2 * 12/2008 Yamamoto .......... G06F 16/9577
715/273
8,560,738 B2    10/2013 Aritomi
(Continued)

FOREIGN PATENT DOCUMENTS

JP    2004-362240 A    12/2004
JP    2011-060143 A    3/2011
(Continued)

*Primary Examiner* — Marcellus J Augustin
(74) *Attorney, Agent, or Firm* — Harness, Dickey & Pierce, P.L.C.

(57) ABSTRACT

A device controlling a printing apparatus is enabled to efficiently acquire information on a data form or the like applicable to the printing apparatus. A terminal device includes a communication interface that can communicate with a printer. The terminal device includes a terminal control unit that requests the printer to communicate using a specific communication port via the communication interface and receives a responding state of the printer to the request. The terminal control unit determines a data form applicable to the printer based on the response and communicates with the printer via the communication interface using data in the determined data form.

15 Claims, 6 Drawing Sheets

(56) References Cited

U.S. PATENT DOCUMENTS

| | | | |
|---|---|---|---|
| 9,007,641 B2 | 4/2015 | Morimoto | |
| 2002/0072998 A1* | 6/2002 | Haines | G06Q 10/087 |
| | | | 705/28 |
| 2002/0154333 A1* | 10/2002 | Akashi | G06F 21/608 |
| | | | 358/1.15 |
| 2004/0156074 A1* | 8/2004 | Kim | H04N 1/00222 |
| | | | 358/1.15 |
| 2005/0248803 A1 | 11/2005 | Ohara | |
| 2008/0052384 A1* | 2/2008 | Marl | H04L 12/2807 |
| | | | 709/223 |
| 2008/0309961 A1* | 12/2008 | Aichi | H04N 1/00244 |
| | | | 358/1.15 |
| 2010/0042736 A1 | 2/2010 | Ray et al. | |
| 2010/0100588 A1* | 4/2010 | Huster | H04L 67/02 |
| | | | 709/203 |
| 2011/0093621 A1 | 4/2011 | Aritomi | |
| 2011/0242569 A1 | 10/2011 | Ohara | |
| 2012/0072531 A1* | 3/2012 | Akuzawa | G06F 9/4401 |
| | | | 709/217 |
| 2013/0321844 A1 | 12/2013 | Ohara | |
| 2014/0192376 A1 | 7/2014 | Morimoto | |
| 2014/0222545 A1* | 8/2014 | Hajji | G06Q 20/20 |
| | | | 705/14.38 |
| 2014/0320900 A1* | 10/2014 | Moriya | G06F 3/1206 |
| | | | 358/1.15 |
| 2015/0355865 A1 | 12/2015 | Ohara | |

FOREIGN PATENT DOCUMENTS

| | | |
|---|---|---|
| JP | 2011-210035 A | 10/2011 |
| JP | 2013-097428 A | 5/2013 |
| JP | 2014-134861 A | 7/2014 |
| WO | WO-2011-048670 A1 | 4/2011 |

\* cited by examiner

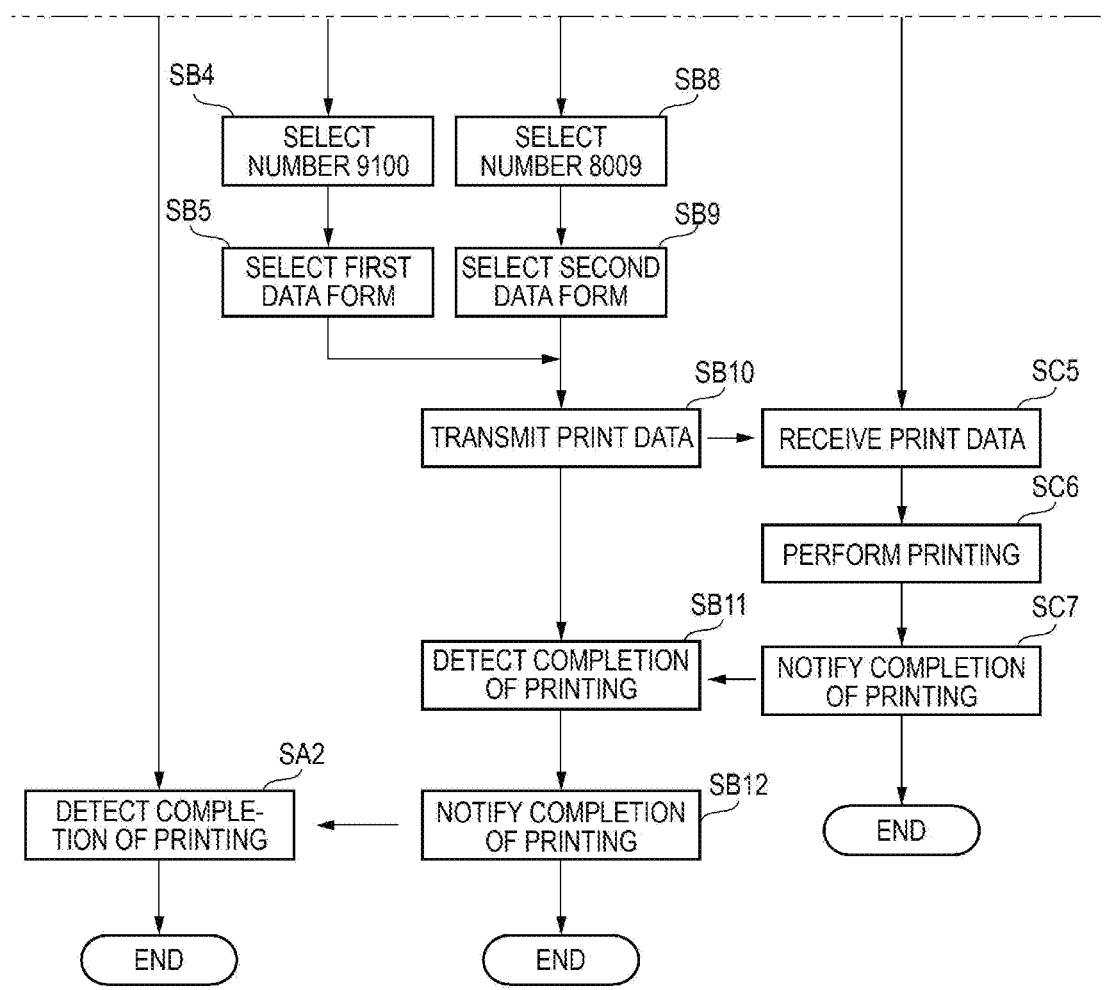

PRINT CONTROL DEVICE, PRINT SYSTEM, AND PRINT CONTROL METHOD

TECHNICAL FIELD

The present invention relates to a print control device, a print system, and a print control method.

BACKGROUND ART

In general, when a printing apparatus such as a printer is used, it is necessary to transmit and receive data in a form suitable for a specification of the printing apparatus. The specification relevant a data form such as a protocol may often vary depending on models of printing apparatuses. Accordingly, a method of setting a data form applicable to a printing apparatus has been proposed (for example, see PTL 1). In the method described in Patent Literature 1, a protocol is selected by causing a device, which can communicate with plural printing apparatuses and a dedicated server, to transmit an inquiry to the server.

CITATION LIST

Patent Literature

PTL 1: JP-A-2004-362240

SUMMARY OF INVENTION

Technical Problem

The method described in Patent Literature 1 requires a server device, and thus is convenient when plural printing apparatuses are used as described in Patent Literature 1, but is poor in efficiency because the number of apparatuses is large.

The present invention is made in consideration of the above-mentioned circumstances and an object thereof is to enable a device controlling a printing apparatus to efficiently acquire information on a data form or the like applicable to the printing apparatus.

Solution to Problem

In order to achieve the above-mentioned object, according to an aspect of the present invention, there is provided a print control device including: a communicator (communication unit) configured to communicate with a printing apparatus; and a controller (control unit) configured to request the printing apparatus to communicate using a specific communication port via the communicator and determines a data form applicable to the printing apparatus based on a responding state of the printing apparatus to the request, wherein the controller communicates with the printing apparatus via the communicator using data in the data form determined based on the responding state of the printing apparatus.

According to the present invention, it is possible to determine a data form applicable to a printing apparatus based on a responding state of the printing apparatus. Accordingly, even a device not having information on a specification of the printing apparatus can control the printing apparatus based on whether a response is received from the printing apparatus. In this configuration, since a device such as a server device is not required, the configuration can be applied regardless of the scale of a system including the printing apparatus. The information transmitted from the printing apparatus is information on a communicable communication port and is general information. Accordingly, the present invention can be applied without mounting a specific function on the printing apparatus.

According to the present invention, it is possible to control the printing apparatus using the data form applicable to the printing apparatus.

In the print control device according to the present invention, the controller may transmit data for requesting printing apparatus information on the printing apparatus to the printing apparatus in a first data form when a response is received from the printing apparatus after the printing apparatus is requested to communicate using the specific communication port via the communicator.

According to the present invention, it is possible to determine whether the first data form is applicable to the first printing apparatus based on the response to the request for the printing apparatus information.

In the print control device according to the present invention, the controller may determine that the data form applicable to the printing apparatus is the first data form when the printing apparatus information is received from the printing apparatus in response to the request, and may determine that the data form applicable to the printing apparatus is a second data form when the printing apparatus information is not received from the printing apparatus.

According to the present invention, it is possible to determine the data form applicable to the printing apparatus based on the response to the request for the printing apparatus information and to control the printing apparatus using the data form applicable to the printing apparatus.

In the print control device according to the present invention, the controller may determine that the data form applicable to the printing apparatus is the first data form when a response is not received from the printing apparatus after the printing apparatus is requested to communicate using the specific communication port via the communicator.

According to the present invention, even a printing apparatus not having a function of transmitting a response to a request for communication using a specific communication port can be controlled by transmitting data to the printing apparatus. For example, when a data form which is generally used by a printing apparatus not having a function of transmitting a response to a request for communication using a specific communication port is a first form, this form be set to control more printing apparatuses, which is useful.

In the print control device according to the present invention, the controller may transmit print data to the printing apparatus using data suitable for the data form applicable to the printing apparatus to perform a printing operation.

According to the present invention, it is possible to cause a printing apparatus to perform a printing operation using the data form applicable to the printing apparatus.

In the print control device according to the present invention, the communicator may access a communication network to which a plurality of the printing apparatuses are able to be connected, and the controller may search the printing apparatuses connected to the communication network via the communicator and may request the searched printing apparatuses to communicate using the specific communication port.

According to the present invention, it is possible to search for a printing apparatus available via the communication network and to determine a data form applicable to the printing apparatus. Accordingly, when the print control device can communicate with plural printing apparatuses or the number of printing apparatuses available is not known, it is possible to select and use a printing apparatus from the plural printing apparatuses without performing a complicated process.

In the print control device according to the present invention, the controller may generate data format information in which the determination result of the data form applicable to the printing apparatus and the printing apparatus are correlated with each other.

According to the present invention, it is possible to search for a printing apparatus available via the communication network and to acquire information on data forms applicable to the printing apparatuses. Accordingly, when the print control device can communicate with plural printing apparatuses, information required for controlling the printing apparatuses can be generated in advance. As a result, it is possible to freely select and control plural printing apparatuses.

In order to achieve the above-mentioned object, according to the present invention, there is provided a print system including: a printing apparatus configured to perform a printing operation based on print data; and a print control device including a communicator configured to communicate with the printing apparatus and a controller configured to request the printing apparatus to communicate using a specific communication port via the communicator and determines a data form applicable to the printing apparatus based on a responding state of the printing apparatus to the request, wherein the controller of the print control device communicates with the printing apparatus via the communicator using data in the data form determined based on the responding state of the printing apparatus.

According to the present invention, it is possible to determine a data form applicable to a printing apparatus based on a responding state of the printing apparatus. Accordingly, even a device not having information on a specification of the printing apparatus can control the printing apparatus based on whether a response is received from the printing apparatus. The information transmitted from the printing apparatus is information on a communicable communication port and is general information. Accordingly, the present invention can be applied without mounting a specific function on the printing apparatus.

In order to achieve the above-mentioned object, according to the present invention, there is provided a print control method of a printing apparatus, wherein the printing apparatus is requested to communicate using a specific communication port, a data form applicable to the printing apparatus is determined based on a responding state of the printing apparatus transmitted from the printing apparatus in response to the request, and communication with the printing apparatus is performed by the communicator using data in the data form determined based on the responding state of the printing apparatus.

According to the present invention, it is possible to determine a data form applicable to a printing apparatus based on a responding state of the printing apparatus. Accordingly, even a device not having information on a specification of the printing apparatus can control the printing apparatus based on whether a response is received from the printing apparatus. The information transmitted from the printing apparatus is information on a communicable communication port and is general information. Accordingly, the present invention can be applied without mounting a specific function on the printing apparatus.

DESCRIPTION OF EMBODIMENTS

[First Embodiment]

Hereinafter, an embodiment of the present invention will be described with reference to the accompanying drawings.

Figure 1:
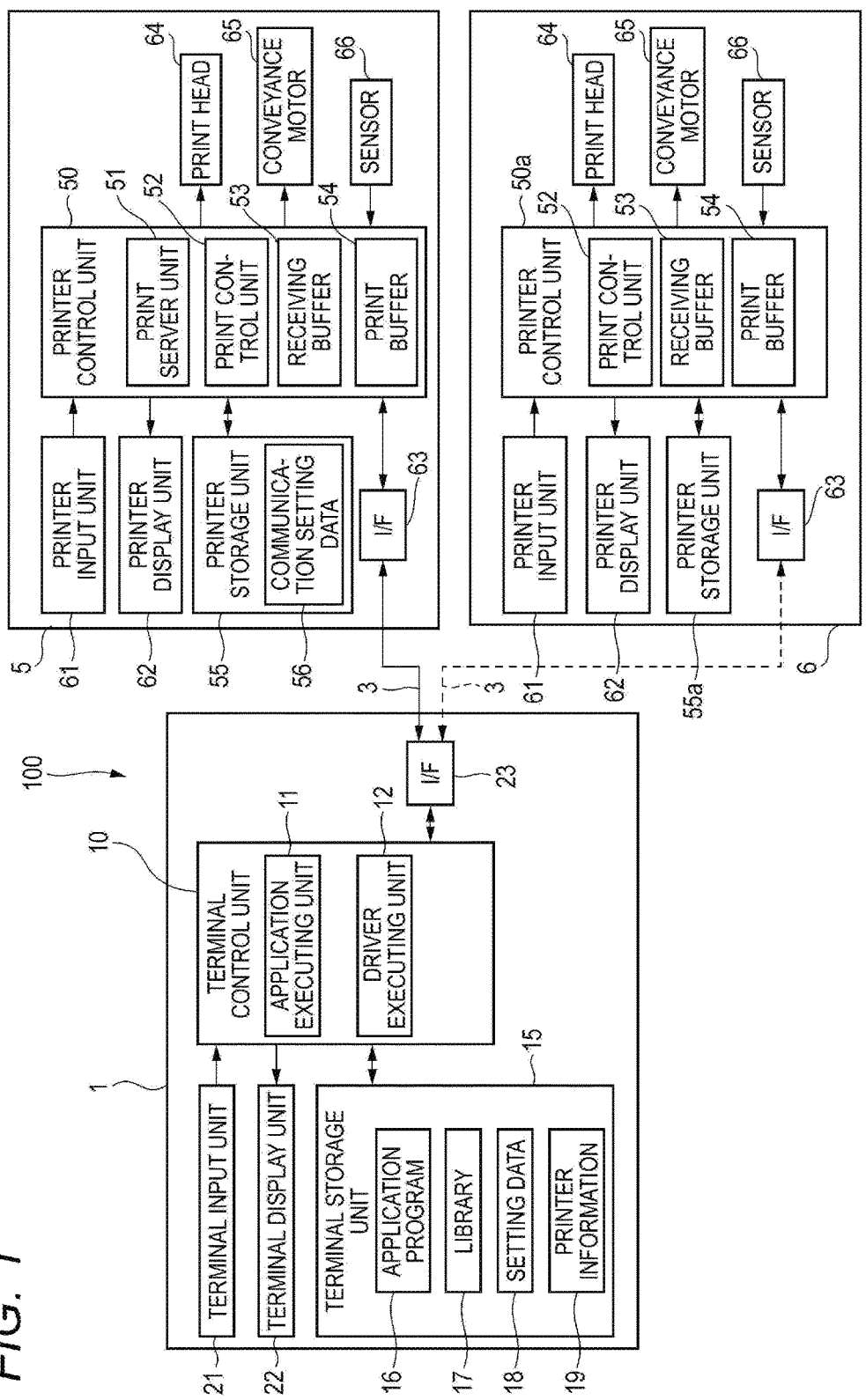
FIG. 1 is a block diagram illustrating a configuration of a print system according to a first embodiment.

FIG. 1 is a functional block diagram of a print system 100 according to a first embodiment.

The print system 100 has a configuration in which a printer 5 (printing apparatus) and a terminal device 1 (print control device) controlling the printer 5 are connected to each other. A printer 6 (printing apparatus) instead of the printer 5 can be connected to the terminal device 1. The print system 100 is a system in which an operator operates the terminal device 1, the terminal device 1 outputs print data to the printer 5 in response to the operation, and the printer 5 performs a printing operation on a printing medium based on the print data. When the printer 6 is connected to the terminal device 1, the printer 6 performs a printing operation on a printing medium in response to the operation of the terminal device 1.

The terminal device 1 and the printer 5 or the printer 6 are connected to each other via a communication line 3. The communication line 3 is constituted by a communication cable or a wireless communication channel. For example, the communication line 3 is a one-to-one connecting communication cable based on various standards such as USB, IEEE1284, IEEE1394, and RS-232C or a wired network based on Ethernet (registered trademark). The communication line 3 may employ short-range wireless communication such as Bluetooth (registered trademark) or wireless USB or a wireless communication network such as a wireless LAN.

The number of printer 5 or printer 6 connected to the terminal device 1 is not particularly limited, but it is assumed in this embodiment that a single printer 5 or printer 6 is connected to the terminal device 1.

In the following description, the terminal device 1 and the printer 5 or the printer 6 are preferably connected to each other via the communication line 3 constituted by a wired LAN or a wireless LAN.

The terminal device 1 is computer which is operated by an operator and examples thereof include a desktop computer, a notebook computer, a tablet computer, a so-called smartphone, and a portable phone. The terminal device 1 has an operating system such as a Windows (registered trademark) operating system, an Android (registered trademark) operating system, or an iOS (registered trademark) mounted on hardware thereof. The terminal device 1 detects an input operation using a function of the operating system, performs a function corresponding to the operation, and displays information relevant to the performed function on a screen.

The terminal device 1 includes a terminal input unit 21 (inputter) that detects an operation of the terminal device 1, a terminal display unit 22 (display) that displays a variety of information, and a communication interface (I/F) 23 that accesses the printer 5 or the printer 6. The terminal input unit 21 and the terminal display unit 22 are used by the operation by an operator. The communication interface 23 (communication unit, communicator) performs data communication with the printer 5 or the printer 6 via the communication line 3. The communication interface 23 is a wired communication interface based on USB, IEEE1284, IEEE1394, RS-232C, and Ethernet or a wireless communication interface such as Bluetooth, Wireless USB, wireless LAN.

The terminal device 1 includes a terminal control unit 10 (control unit, controller) that controls the units of the terminal device 1. The terminal control unit 10 includes an application executing unit 11 (executor) and a driver executing unit 12 (executor). The terminal control unit 10 includes a CPU, a ROM, a RAM that are not illustrated and realizes the functions of the terminal device 1 by executing a program. A basic control program or the like which can be executed by the CPU is stored in a nonvolatile manner in the ROM of the terminal control unit 10. Programs which are executed by the CPU, data to be processed, or the like is temporarily stored in the RAM.

A terminal storage unit 15 (storage) is connected to the terminal control unit 10. The terminal storage unit 15 is constituted by a storage device including a magnetic storage medium or a semiconductor memory device and stores programs which are executed by the CPU (not illustrated) of the terminal control unit 10 and data which are processed by the CPU in a nonvolatile manner. The terminal storage unit 15 stores, for example, an application program 16 which is executed by the terminal control unit 10, a library 17 which is processed by the terminal control unit 10, setting data 18, and printer information 19.

The application program 16 is an application program such as a document preparing program, an image editing program, a POS application, or a label preparing program. The application program 16 is executed by the application executing unit 11 of the terminal control unit 10. In other words, the application executing unit 11 is a functional block indicating a function of causing the CPU of the terminal control unit 10 to execute the application program 16. When the application executing unit 11 executes the application program 16, various functions such as a document preparing operation, an image editing operation, an operation as a POS terminal, and a label preparing operation by the terminal device 1 can be used.

The library 17 is middleware that constitutes a part of the operating system of the terminal device 1 and performs functions such as control of peripheral devices. The library 17 according to this embodiment has a function of transmitting a command instructing to perform a printing operation or data to be printed to the printer 5 or the printer 6. By causing the CPU of the terminal control unit 10 to execute the library 17, the function of the driver executing unit 12 is realized. The driver executing unit 12 executes a printer driver program (not illustrated), which is stored in the terminal storage unit 15, corresponding to the printer 5 or the printer 6. The driver executing unit 12 acquires data of a document or an image generated by the application executing unit 11 and transmits print data including various commands or data in a form suitable for the printer 5 or the printer 6 via the communication interface 23. The print data includes, for example, a command to instruct execution of a printing operation and data to be printed.

The printer 5 performs a printing operation on a printing medium that is not illustrated based on the print data transmitted from the terminal device 1. The printing medium which is used in the printer 5 is a cut sheet which is cut into a predetermined size or a continuous sheet, the sheets are formed of paper or a synthetic resin, and may be subjected to surface treatment. Examples of the continuous sheet include a rolled sheet or a fan-folded sheet. A label sheet which is obtained by arranging labels with a regular size in which an adhesive is attached to the back side thereof on a release sheet (mount) and rolling the resultant in a roll shape may be used. The printing method of the printer 5 is arbitrary. In this embodiment, an inkjet printer in which a rolled sheet in which a plain sheet is rolled in a roll shape is as a printing medium and ink is ejected to the printing medium to perform a printing operation is exemplified.

The printer 5 includes a print head 64. The print head 64 in this embodiment is an inkjet print head including nozzles ejecting ink. The print head 64 is a line head in which nozzles are arranged in lines over the entire printing range in a direction perpendicular to a conveying direction. The print head 64 includes a nozzle line for each of four colors of cyan (C), magenta (M), yellow (Y), and black (K) and can perform a printing operation on a printing medium in full colors. The print head 64 may additionally use ink of multiple colors or may use two colors or black and white ink.

The print head 64 may be a thermal head that applies heat to a heat-sensitive sheet to perform a printing operation and the printer 5 may be a thermal printer.

The printer 5 includes a printer control unit 50 (controller) that controls the units of the printer 5. The printer control unit 50 includes a CPU, a ROM, and a RAM that are not illustrated. Firmware which can be executed by the CPU, data of the firmware, and the like are stored in a nonvolatile manner in the ROM of the printer control unit 50. Data of the firmware which is executed by the CPU or the like is temporarily stored in the RAM. The printer control unit 50 may further include other peripheral circuits and the like.

In addition to the above-mentioned print head 64, units such as a printer input unit 61 (inputter), a printer display unit 62 (display), a communication interface (I/F) 63, a sensor 66, a conveyance motor 65, and a printer storage unit 55 (storage) are connected to the printer control unit 50.

The printer input unit 61 includes various switches and outputs a signal corresponding to an operation of the switches to the printer control unit 50. The printer display unit 62 includes an LED indicator or a liquid crystal display panel that displays an operating state or the like of the printer 5 under the control of the printer control unit 50. A communication interface 63 executes data communication with the terminal device 1 via the communication line 3. For example, the communication interface 63 is a wired communication interface based on USB, IEEE1284, IEEE1394, RS-232C, or Ethernet or a wireless communication interface such as Bluetooth, Wireless USB, or wireless LAN.

The conveyance motor 65 rotates a conveyance roller (not illustrated) to convey a printing medium under the control of the printer control unit 50.

The sensor 66 is an optical sensor which is disposed in a conveying path of the printing medium. The printer control unit 50 detects a printing medium or a position-detecting mark (not illustrated) attached to the printing medium using the sensor 66.

The printer control unit 50 includes a print server unit 51 (server) and a print control unit 52 (controller) as execution units (executor) that perform functions. These execution units correspond to functions which are realized when the CPU executes the firmware. A receiving buffer 53 and a print buffer 54 are disposed in a memory area of the RAM (not illustrated) constituting the printer control unit 50. One or both of the receiving buffer 53 and the print buffer 54 may be disposed in the printer storage unit 55 or may be disposed in a RAM externally connected to the printer control unit 50.

The printer storage unit 55 is constituted by a storage device including a magnetic storage medium or a semiconductor memory device and stores a variety of data in a nonvolatile manner so as to be rewritable. The printer storage unit 55 stores communication setting data 56 including information on the specification of data communication of the printer 5 or the like.

When a predetermined communication port is designated for the communication interface 63 and a hypertext transfer protocol (http) access is carried out, the printer server unit 51 performs a process as a web server for the access.

The print server unit 51 performs data communication with the terminal device 1 via the communication interface 63. When print data transmitted from the terminal device 1 is received via the communication interface 63, the print server unit 51 stores the received print data in the receiving buffer 53. The received print data is accumulated in the receiving buffer 53 in the receiving order.

The print server unit 51 is configured to receive and process print data in a predetermined data format. The data format of the print data corresponds to an example of the data form in the claims. The data format received by the print server unit 51 is, for example, an ESC/POS (registered trademark) format (first data form) or an XML format (second data form). In a configuration corresponding to data in the XML format, the communication port via which the print server unit 51 receives the print data is, for example, port 8009 which is set in advance for XML data. When the terminal device 1 accesses the port 8009, the print server unit 51 receives data in the XML format transmitted from the terminal device 1 in response to the access. The print server unit 51 converts the received data in the XML format into data in the ESC/POS format which can be processed by the print control unit 52 and stores the converted data in the receiving buffer 53. In a configuration corresponding to data in the ESC/POS format, the communication port via which the print server unit 51 receives print data is, for example, port 9100 which is set in advance for data for the ESC/POS format.

The print control unit 52 analyzes a command included in the print data stored in the receiving buffer 53. When an instruction to perform a printing operation and data to be printed are detected, the print control unit 52 develops the data into the print buffer 54 and generates a printing image. The print control unit 52 controls the print head 64 and the conveyance motor 65 so as to print the printing image developed into the print buffer 54 on a printing medium.

The print server unit 51 has a function of transmitting a list of communication ports via which the printer 5 can communicate to the terminal device 1 in response to the http access of the terminal device 1. Information indicating the communication ports via which the printer 5 can communicate is included in the communication setting data 56 stored in the printer storage unit 55. The print server unit 51 reads the communication setting data 56 and transmits the list of communication ports communicable to the terminal device 1 in response to the http access to the communication interface 63.

Similarly to the printer 5, the printer 6 is a printer that performs a printing operation based on print data transmitted from the terminal device 1. The elements of the printer 6 common to the elements of the printer 5 will be referenced by the same reference numerals and description thereof will not be repeated.

The printer 6 includes a printer control unit 50*a* (controller) that controls the units of the printer 6. The printer control unit 50*a* includes a CPU, a ROM, and a RAM that are not illustrated similarly to the printer control unit 50. Firmware which can be executed by the CPU, data of the firmware, and the like are stored in a nonvolatile manner in the ROM of the printer control unit 50*a*. Data of the firmware which is executed by the CPU or the like is temporarily stored in the RAM. The printer control unit 50*a* may further include other peripheral circuits and the like. The printer control unit 50*a* includes a print control unit 52, a receiving buffer 53, and a print buffer 54 similarly to the printer control unit 50. On the other hand, the printer control unit 50*a* does not include a print server unit 51. Accordingly, when the printer 6 receives print data transmitted from the terminal device 1 via the communication interface 63, the printer control unit 50*a* stores the received print data in the receiving buffer 53.

The printer 6 includes a printer storage unit 55*a* (controller) instead of the printer storage unit 55. The printer storage unit 55*a* stores programs or data in a nonvolatile manner similarly to the printer storage unit 55. The printer storage unit 55*a* does not store the communication setting data 56. The printer storage unit 55*a* may store data such as the communication setting data 56, but does not need to store the communication setting data 56 at least for the purpose of transmitting information indicating a communication port as in the printer 5.

The printer 6 receives print data in a predetermined format or another command, stores the received print data or a command in the receiving buffer 53, and performs a printing operation or an operation designated by the command. When a command not defined in a command system corresponding to the printer 6 is received via the communication interface 63, the printer control unit 50*a* of the printer 6 stores the received command and does not execute but reads the command.

The printer 6 can be said to be a conventional printer corresponding to an existing command system such as an ESC/POS format. The printer 6 does not cope with data in the XML format. The printer 6 does not include the print server unit 51 unlike the printer 5 and thus does not respond as a web server in response to the http access when the terminal device 1 performs the http access.

In this way, the terminal device 1 can be connected to two types of the printer 5 and the printer 6 and there is a possibility that data forms applicable to the printer 5 and the printer 6 will be different from each other. In this embodiment, the data form is any one of the XML format and the ESC/POS format, but the terminal device 1 does not know whether a data format applicable to the printer 5 or the printer 6 is the XML format or the ESC/POS format. The terminal device 1 needs to transmit control data or print data in an applicable data format to the printer 5 or the printer 6 connected to the communication interface 23.

Figure 2:
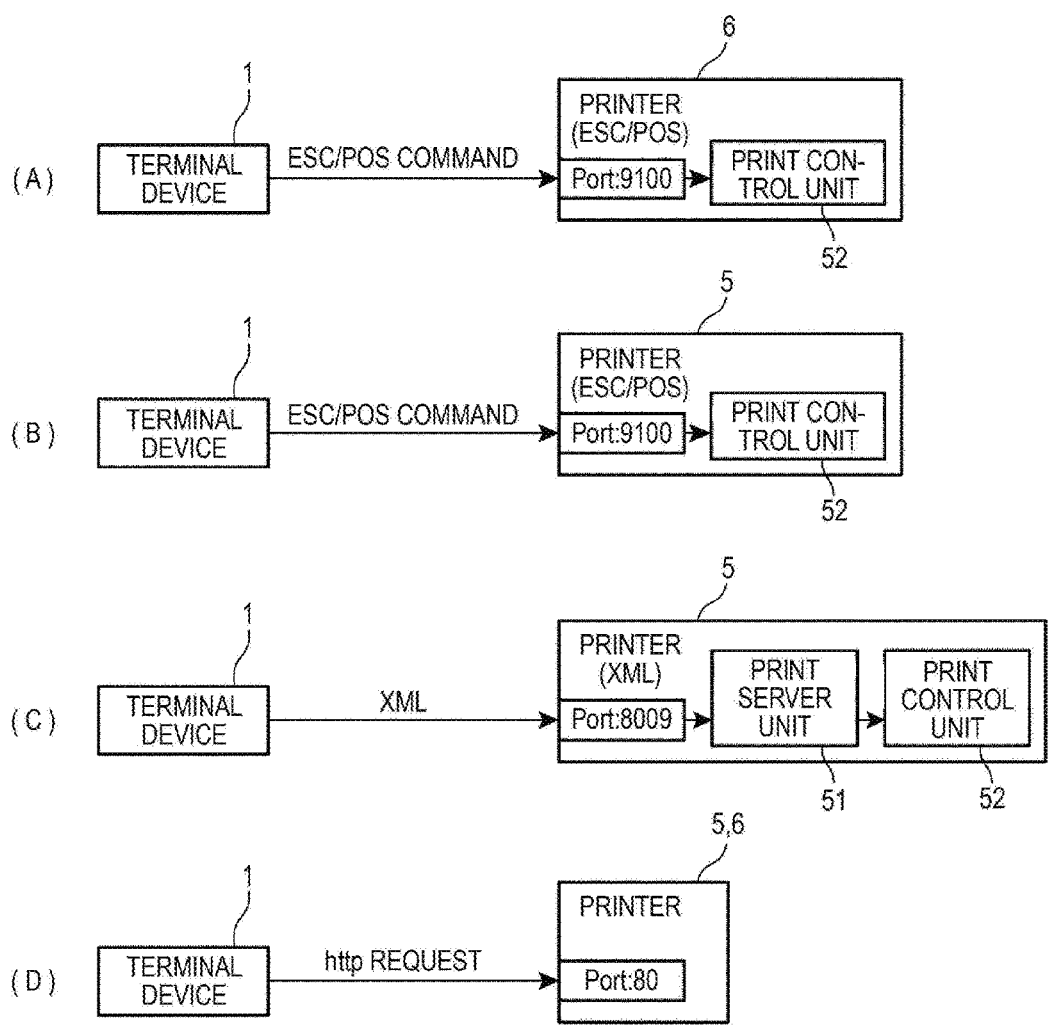
FIG. 2 is a diagram schematically illustrating an operation of the print system.

FIG. 2 is a diagram schematically illustrating an operation of the printing system 100. FIG. 2(A) illustrates an operation when the printer 6 corresponding to the ESC/POS format is connected to the terminal device 1. FIG. 2(B) illustrates an operation when the printer 5 is connected to the terminal device 1 as the printer corresponding to the ESC/POS format. FIG. 2(C) illustrates an operation when the printer 5 is connected to the terminal device 1 as a printer corresponding to the XML format. FIG. 2(D) illustrates an operation of the terminal device 1 specifying a data format applicable to the printer 5 or the printer 6 connected thereto.

As illustrated in FIGS. 2(A) and 2(B), when the printer connected to the terminal device 1 is a printer (the printer 5 or the printer 6) corresponding to the ESC/POS format, the terminal device 1 instructs the printer 5 or the printer 6 to perform a printing operation using the ESC/POS command.

On the other hand, when the printer 5 as the printer corresponding to the XML format is connected to the terminal device 1 as illustrated in FIG. 2(C), the terminal device 1 transmits print data in the XML format to the printer 5 to perform a printing operation. The printer 5 converts the print data in the XML format into print data in the ESC/POS format using the print server unit 51, and performs a printing operation based on the print data in the ESC/POS format using the print control unit 52.

The operations of the terminal device 1 illustrated in FIGS. 2(A), 2(B), and 2(C) can be performed when information on the data format applicable to the printer 5 or the printer 6 connected to the terminal device 1 is acquired by the terminal device 1. Therefore, the terminal device 1 transmits an http request to the printer 5 or the printer 6 connected to the terminal device 1 as illustrated in FIG. 2(D). The http request requests a list of port numbers via which the printer 5 or the printer 6 connected to the terminal device 1 can receive data. As in the above-mentioned example, when data in the XML format is transmitted and received in the print system 100, the port number via which the printer 5 receives data in the XML format is 8009 and the port number via which the printer 5 receives the ESC/POS command is 9100. Accordingly, the terminal device 1 can determine whether the data format applicable to the printer 5 connected thereto is the ESC/POS format or the XML format based on the list of port numbers via which the printer 5 responds. When a response to the http request is not transmitted, the terminal device 1 can determine that the printer 6 not having a function of responding to the http request is connected thereto. In this case, the terminal device 1 selects a data format of a predetermined initial value (default). The default data format is, for example, the ESC/POS command applicable to the conventional printer.

The port numbers exemplified herein are port numbers when communication using TCP/IP (Transmission Control Protocol/Internet Protocol) or UDP (User Datagram Protocol) is used. When the terminal device 1 and the printer 5 or the printer 6 are connected to each other without using TCP/IP or UDP, the http request is not performed. For example, the terminal device and the printer are connected to each other using a one-to-one connecting communication cable based on various standards such as USB, IEEE1284, IEEE1394, and RS-232C or Bluetooth.

Therefore, the operation illustrated in FIG. 2(D) is applied to a case in which the printer 5 or the printer 6 is connected to the terminal device 1 in a form corresponding to the TCP/IP or the UDP such as a wired LAN or a wireless LAN.

Figure 3:
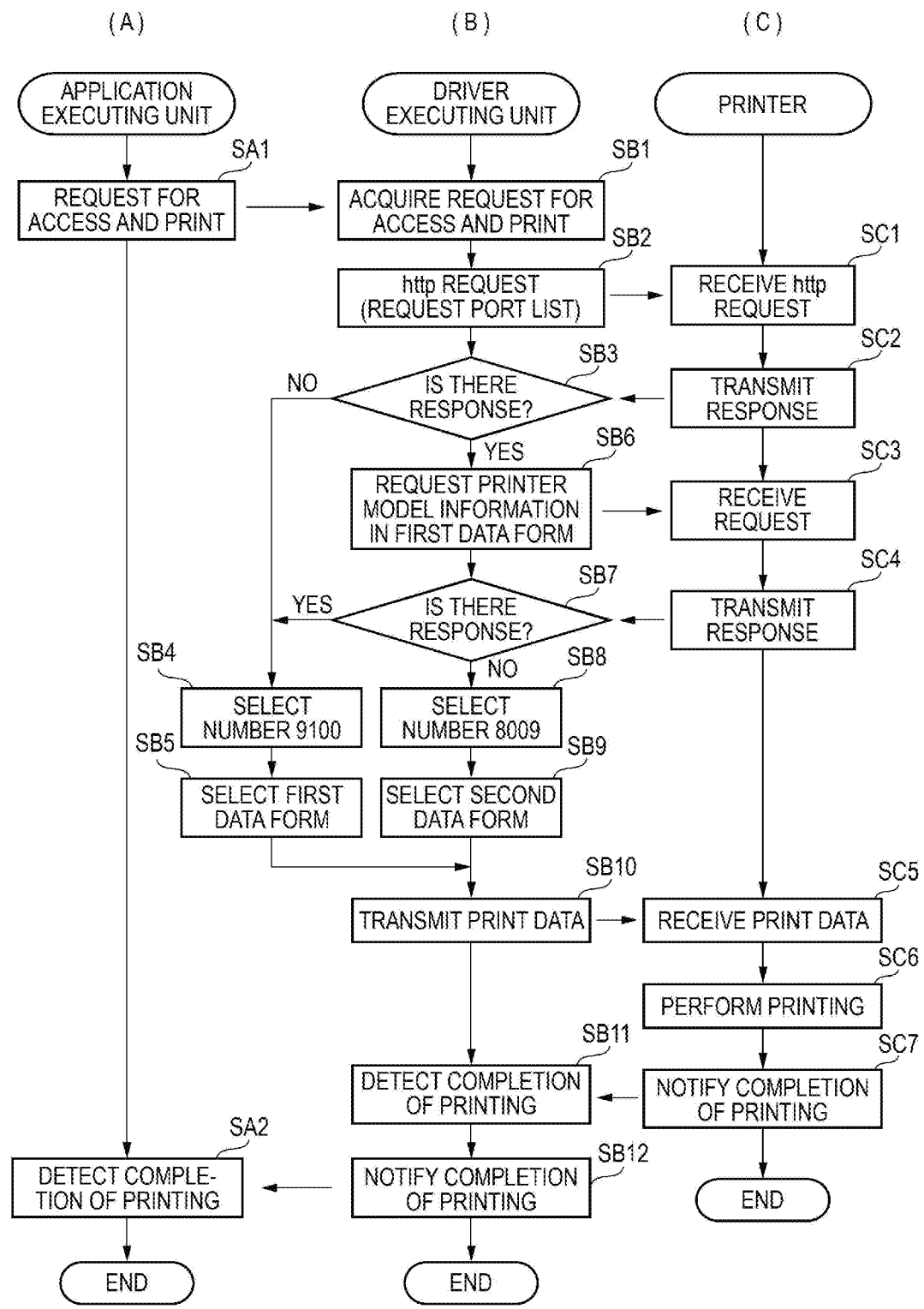
FIG. 3 is a flowchart illustrating the operation of the print system.

FIG. 3 is a flowchart illustrating an operation of the print system 100. FIG. 3(A) illustrates an operation of the application executing unit 11, FIG. 3(B) illustrates an operation of the driver executing unit 12, and FIG. 3(C) illustrates an operation of the printer 5. When document preparation or image editing is performed by the application executing unit 11 and a printing operation is instructed by an operator's operation, the application executing unit 11 calls the library 17 and requests an access to the printer 5 and a printing operation (step SA1). The driver executing unit 12 starts its operation in response to the call of the library 17 and acquires the request for access and printing output from the application executing unit 11 (step SB1). Here, the drive executing unit 12 acquires data to be printed which is generated by the application executing unit 11.

The driver executing unit 12 generates and transmits an http request for requesting a list of port numbers to the printer 5 connected to the communication interface 23 (step SB2). The http request is transmitted to, for example, a TCP 80 port similarly to a normal http access. The http request is not limited to the request for the list of port numbers.

The printer 5 receives the http request transmitted from the terminal device 1 (step SC1), generates the requested list of port numbers based on the communication setting data 56 stored in the printer storage unit 55, and transmit the generated list to the terminal device 1 (step SC2).

The driver executing unit 12 waits until the list of port numbers is transmitted from the printer 5 (step SB3). When the list of port numbers is not received within a predetermined time (NO in step SB3), that is, when a response to the request for the list of port numbers is not transmitted, the driver executing unit 12 selects 9100 as the port number of the destination of the print data (step SB4). Subsequently, the driver executing unit 12 selects the ESC/POS format as the data format corresponding to the selected port (step SB5).

On the other hand, when the list of port numbers is received within the predetermined time (YES in step SB3), that is, when a response to the request for the list of port numbers is transmitted, the driver executing unit 12 requests printer model information (printing apparatus information) indicating the model of the printer 5 using data in the ESC/POS format (step SB4). The printer 5 receives the request for the printer model information from the terminal device 1 (step SC3) and transmits the printer model information (step SC6). The driver executing unit 12 waits until the printer model information is transmitted from the printer 5 (step SB7). When the printer model information is received with a predetermined time (YES in step SB7), that is, when a response to the request for the printer model information is transmitted, the driver executing unit 12 sets the port number of the destination of the print data to 9100 and selects the ESC/POS format as the data format corresponding to the selected port. That is, the driver executing unit 12 employs the ESC/POS format when the printer 5 can cope with both the XML format and the ESC/POS format.

On the other hand, when the printer model information is not received within the predetermined time (NO in step SB7), that is, when a response to the request for the printer model information is not transmitted, the driver executing unit 12 sets the port number of the destination of the print data to 8009 (step SB8). Subsequently, the driver executing unit 12 selects the XML format as the data format corresponding to the selected port (step SB9).

Here, the driver executing unit 12 generates printer information 19 (data format information) indicating the data format of the printer 5 connected to the communication interface 23 and stores the generated printer information in the terminal storage unit 15.

In the printer information 19, at least information specifying the printer 5 and information indicating the data format corresponding to the printer 5 are correlated with each other. The printer information 19 may include the communication port number via which the printer 5 can receive the print data in addition to the data format corresponding to the printer 5. When plural communication ports via which the printer 5 can receive the print data are present, the driver executing unit 12 registers the data format determined in steps SB5 and SB9 and information on the communication port corresponding to the data format in the printer information 19.

The operations of steps SB2 to SB9 can be skipped thereafter using the printer information 19 when the driver executing unit 12 causes the printer 5 to perform a printing operation.

The driver executing unit 12 transmits a printing instruction to print data acquired from the application executing unit 11 or print data including data to be printed to the printer 5 in the data format selected in steps SB5 and SB9 (step SB10).

The printer 5 receives the print data transmitted from the terminal device 1 (step SC5) and performs a printing operation based on the received print data (step SC6). When the received print data is completely printed, the printer 5 generates and transmits a notification indicating completion of printing to the terminal device 1 (step SC7).

The driver executing unit 12 detects the completion of printing based on the notification indicating the completion of printing transmitted from the printer 5 (step SB11) and notifies the application executing unit 11 of the completion of printing (step SB12). The application executing unit 11 detects the completion of printing based on the notification from the driver executing unit 12 (step SA2) and notifies, for example, the terminal display unit 22 of the completion of printing.

When the printer 6 is connected to the terminal device 1, the application executing unit 11 and the driver executing unit 12 of the terminal device also perform the operations illustrated in FIGS. 3(A) and 3(B). In this case, since the printer 6 does not have the function of receiving and analyzing the http request, the driver executing unit 12 cannot receive the list of port numbers (NO in step SB3). Accordingly, the driver executing unit 12 selects a default format (for example, ESC/POS) as the data format to be transmitted and registers the printer 6 and the default data format in the printer information 19 in correlation with each other. Accordingly, the terminal device 1 can control the printer 6 to perform a printing operation.

As described above, the print system 100 according to the first embodiment of the present invention includes the terminal device 1 and the printer 5 or the printer 6 connected to the terminal device 1. The terminal device 1 includes the communication interface 23 which can communicate with the printer 5 and the printer 6. The terminal device 1 includes the terminal control unit 10 that requests the printer 5 or the printer 6 to communicate using a specific communication port via the communication interface 23 and receives a responding state of the printer 5 or 6 in response to the request. The terminal control unit 10 determines the data form applicable to the printer 5 or the printer 6 based on the responding state of the printer 5 or the printer 6. Accordingly, the terminal device 1 can select the data form suitable for the printer 5 or the printer 6 connected to the communication interface 23, and can transmit the print data to the printer 5 or 6 to perform a printing operation. As a result, even when the terminal device 1 does not include information on the specification of the printer 5 or the printer 6, the terminal device 1 can control the printer 5 or the printer 6. The information transmitted from the printer 5 or the printer 6 is information on a communication port available and is general information. Accordingly, the present invention can be applied without mounting a particular function on the printer 5 or the printer 6.

In the terminal control unit 10, the driver executing unit 12 selects the data form applicable to the printer 5 or the printer 6 connected to the communication interface 23 by causing the application executing unit 11 to call the driver executing unit 12. Accordingly, the application executing unit 11 does not need to perform a process in consideration of the data format corresponding to the printer 5 or the printer 6. As a result, there is an advantage that it is not necessary to mount a function corresponding to a specific printer on the application program 16 which is executed by the application executing unit 11.

Here, the data form means a data format such as the XML format or the ESC/POS format and may be analyzed to mean a command system. For example, an operation of determining a type or a system of commands which are transmitted from the terminal device 1 to the printers 5 and 6 can be said to be an operation of determining a form of data.

The driver executing unit 12 of the terminal control unit 10 can communicate with the printers 5 and 6 via the communication interface 23 using data in the data form which is determined based on the responding state of the printers 5 and 6 and can control the printers 5 and 6. The driver executing unit 12 can transmit print data to the printers 5 and 6 to perform a printing operation using data in the determined data form. The driver executing unit 12 determines the data form applicable to the printer 5 or the printer 6 based on reception of the list of port numbers from the printer 5 or the printer 6 via the communication interface 23 and generates data format information in which the determination result is correlated with the printer 5 or the printer 6. The data format information is stored, for example, as the printer information 19 in the terminal storage unit 15.

The driver executing unit 12 transmits data for requesting printer model information using data in the ESC/POS format to the printer 5 when a response is received from the printer 5 after the http request is transmitted to the printer 5 or the printer 6 via the communication interface 23. Accordingly, since the printer model information is requested using data in the ESC/POS format, the driver executing unit 12 can determine whether the data in the ESC/POS format is a data format applicable to the printer 5 based on a response to the request.

The driver executing unit 12 determines that the ESC/POS format is a data format applicable to the printer 5 when the printer model information is received, and determines that the XML format is a data format applicable to the printer 5 when the printer model information is not received. The driver executing unit 12 selects the ESC/POS format as the data format even when the XML format is applicable to the printer 5 but the printer model information is received. Accordingly, the driver executing unit 12 does not transmit print data in the XML format in performing a printing operation. Therefore, the printer 5 does not need to perform a process of converting data in the XML format into data in the ESC/POS format using the print server unit 51 and thus can shorten the time required for the printing operation. The driver executing unit 12 can control the printer 5 in the XML format applicable to the printer 5 when the printer model information is not received. That is, the driver executing unit 12 can determine the data form applicable to the printer 5 based on the response to the request for the printer model information. Accordingly, the driver executing unit 12 can control the printer 5 using the data form applicable to the printer 5.

The driver executing unit 12 determines that the data format applicable to the printer 5 or the printer 6 is the ESC/POS format when a response is not received from the printer 5 or the printer 6 after the http request is transmitted to the printer 5 and the printer 6 via the communication interface 23. When the determined format is a predetermined format, the driver executing unit 12 can control the printer not having a function of responding to the http request or the printer not having a function of transmitting a list of port numbers.

[Second Embodiment]

Figure 4:
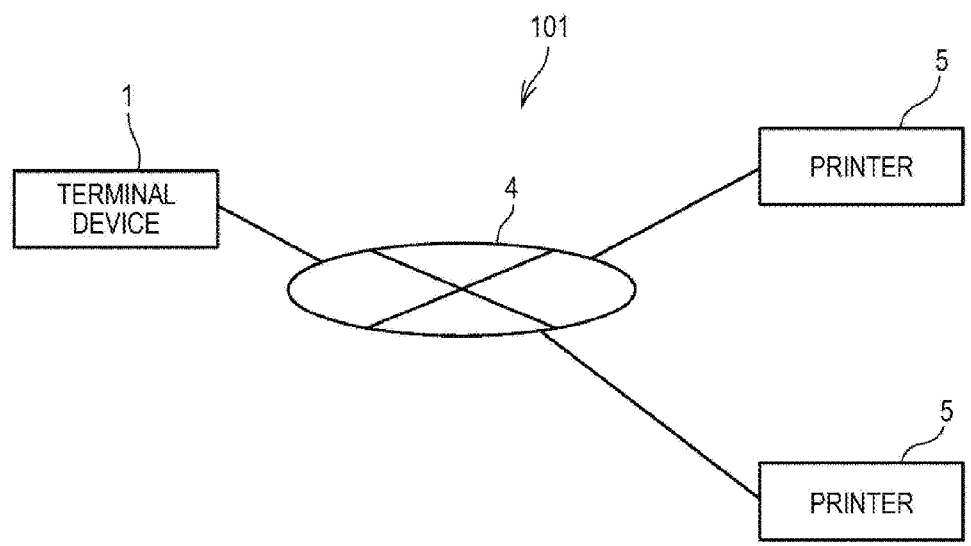
FIG. 4 is a diagram illustrating a configuration of a print system according to a second embodiment.

FIG. 4 is a diagram illustrating a configuration of a print system 101 according to a second embodiment of the present invention. In the print system 101, the elements common to those in the print system 100 according to the first embodiment will be referenced by the same reference numerals and description thereof will not be repeated.

The print system 101 illustrated in FIG. 4 has a configuration in which plural printers 5 are connected to a terminal device 1 via a communication network 4. In this configuration, the terminal device 1 selects one printer 5 to perform a printing operation. Specific network addresses in the communication network 4 are assigned to the terminal device 1 and the printers 5 in the print system 101, and thus the terminal 1 and the printers 5 can be specified in the communication network 4. The communication network 4 may be any one of a wired LAN and a wireless LAN, and a part of the communication network 4 may be constituted by a wide area communication network.

In the printer system 101, even when the terminal device 1 does not have information on data forms applicable to the printers 5 and the number of available printers 5, the terminal device 1 can search the printers 5 and acquire information on the data forms applicable to the printers 5.

Figure 5:
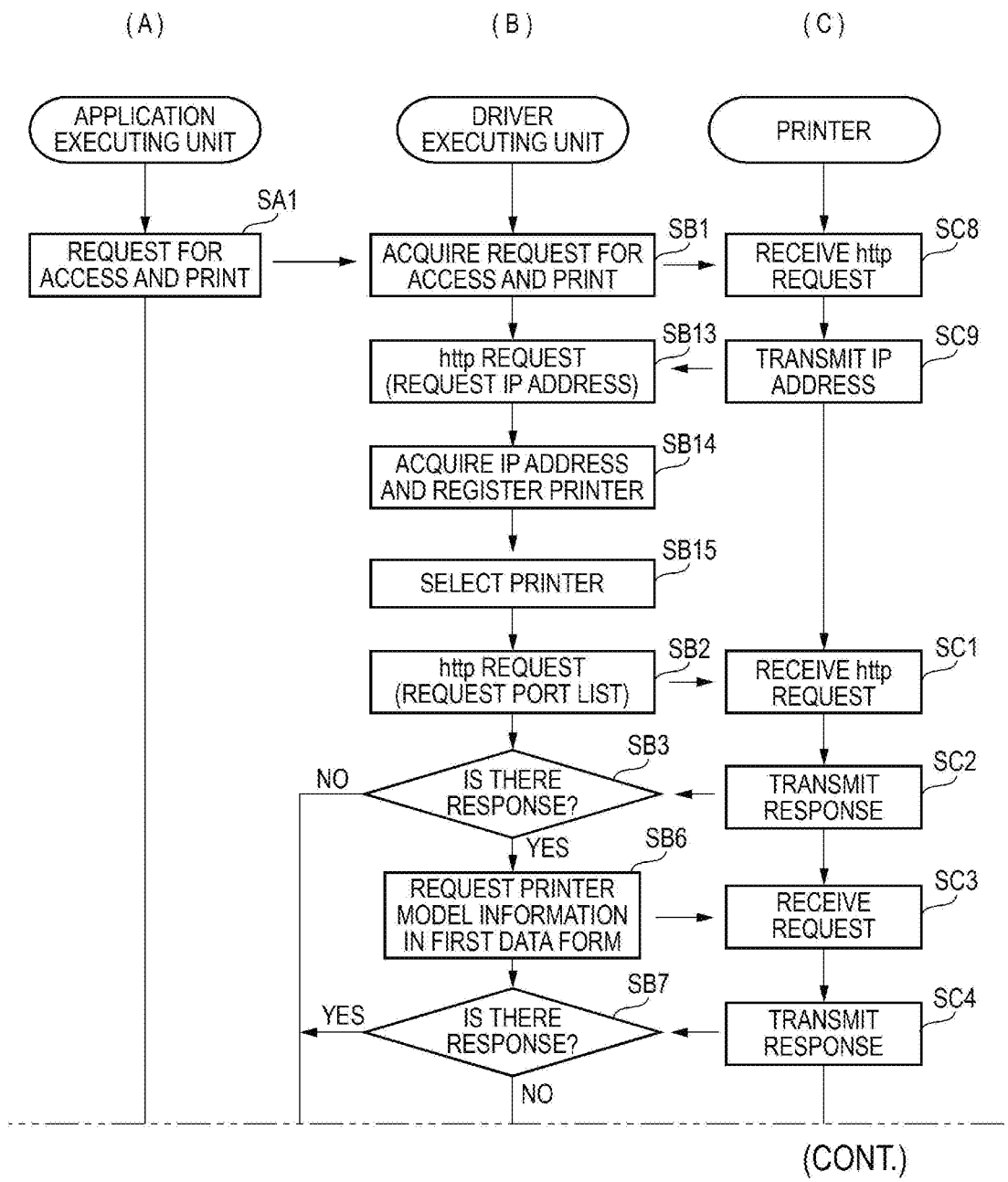
FIG. 5 is a flowchart illustrating an operation of the print system.

FIG. 5 is a flowchart illustrating an operation of the print system 101 according to the second embodiment. FIG. 5(A) illustrates an operation of an application executing unit 11, FIG. 5(B) illustrates an operation f a driver executing unit 12, and FIG. 5(C) illustrates an operation of a printer 5. In the flowcharts illustrated in FIGS. 5(A) to 5(C), the steps common to those in FIGS. 3(A) to 3(C) will be referenced by the same step numbers and description thereof will not be repeated.

When the application executing unit 11 calls the library 17 in step SA1, the driver executing unit 12 starts its operation in response to the call of the library 17 in step SB1. In step SB1, the driver executing unit 12 acquires a request for access and print output from the application executing unit 11, and acquires data to be printed which is generated by the application executing unit 11.

Here, the driver executing unit 12 transmits a http request requesting an IP address to detect the printer 5 connected to the communication network 4 (step SB13). The http request transmitted in step SB13 can be transmitted, for example, in a broadcast manner and can be received by all the printers 5 which can communicate via the communication network 4. When the http request is received (step SC8), the printer 5 transmits the IP address of the printer 5 to the terminal device 1 in response to the http request (step SC9). In step SC9, a host name of the printer 5 in the communication network 4, a model name of the printer 5, the communication port number usable by the printer 5, other information on the printer 5, and the like may be transmitted to the terminal device 1.

The terminal device 1 receives responses including the IP addresses transmitted from the printers 5 and registers the printers 5 based on the received IP addresses (step SB14). The registration of the printers 5 is a process of registering a list of IP addresses transmitted from the printers 5 in the printer information 19. In step SB14, when a response including an IP address is transmitted from a device other than the printers 5 connected to the communication network 4, the driver executing unit 12 may select the responses from the printers 5 and may perform registration thereof.

Thereafter, the driver executing unit 12 selects one printer 5 (step SB15). For example, an operator may perform an input operation on the terminal device 1 and select the printer 5 designated through the input operation. In this case, the IP address of the printer 5 registered in the printer information 19 may be displayed on the terminal display unit 22. The driver executing unit 12 may select one printer 5 based on a predetermined order of priority.

Thereafter, the driver executing unit 12 performs the operations of steps SB2 to SB12 on the selected printer 5. The selected printer 5 performs the operations of steps SC1 to SC7 described in the first embodiment.

In this way, the communication interface 23 of the terminal device 1 is connected to the communication network 4 to which plural printers 5 or printers 6 can be connected, and the driver executing unit 12 searches the printers 5 connected to the communication network 4 and requests a list of port numbers to the searched printers 5. Accordingly, it is possible to search for the available printers 5 via the communication network 4 and to determine the data form applicable to the printers 5. Accordingly, when the driver executing unit 12 can communicate with plural printers 5 or when the number of available printers 5 is not known, it is possible to select and use the plural printers 5 without performing a complicated process. It is possible to search for the available printers 5 via the communication network 4 and to acquire information on the data form applicable to the printers 5.

In the above-mentioned embodiments, the data forms applicable to the printers are two types of the XML format and the ESC/POS format and the terminal device 1 determines the data format applicable to the printers 5 and 6.

Here, examples of the data form applicable to a printer include a command system usable by the printer, an available language, available character codes, an available communication protocol, an available data format (which includes a packet size, a packet format, and the like). That is, the data form is not limited to the data format but may be a command system, a language, a character code, a communication protocol, or the like. The list of port numbers may include specifications of ports such as names of the communication ports and types of communication protocols usable for the communication ports in addition to the port numbers. In this case, the terminal device 1 may determine the data forms applicable to the printers based on the specifications of the ports other than the port numbers.

The above-mentioned embodiments merely represent examples of the present invention and can be modified and applied in various forms without departing from the scope of the present invention.

For example, the above-mentioned embodiments describe the configuration in which the terminal device 1 transmits data in the XML format or the ESC/POS format as an example, but the present invention is not limited to this configuration and may transmit data in more forms. The forms of data to be transmitted are not limited to the above-mentioned two examples.

In the process of step SB3, the driver executing unit 12 determines the data format based on a response to a request for the list of port numbers, but the determination method is not limited to this process. For example, the driver executing unit 12 may determine the data form based on whether the received list of port numbers includes the port number 8009. In this case, the driver executing unit 12 moves the process flow to step SB6 when the list of port numbers includes the port number 8009, and moves the process flow to step SB4 when the list of port numbers does not include the port number 8009.

The functional blocks illustrated in FIG. 1 can be arbitrarily embodied by cooperation of hardware and software and do not indicate specific hardware configurations. The functions of the terminal device 1 and the printer 5 or the printer 6 may be owned by other devices which are externally connected thereto. The terminal device 1 may realize various operations by executing a program stored in a storage medium externally connected thereto. The printer 5 or the printer 6 is not limited to an inkjet printer, but the present invention can be applied to various printing apparatuses such as a dot impact type, a laser type, and a thermal type and multifunction apparatuses having such types of printing units built therein.

INDUSTRIAL APPLICABILITY

As described above, the present invention is useful for a print control device or the like that can determine a data form applicable to a printing apparatus based on a responding state of the printing apparatus and easily control the printing apparatus and is particularly suitable for a print control device or the like not having information on a specification of a printing apparatus without mounting a particular function on the printing apparatus. For example, the print control device can determine a data format which is applicable to a printing apparatus and can be processed at a high speed based on information on whether the printing apparatus responds or information on a communication port with which the printing apparatus can communicate and can easily control the printing apparatus by transmitting print data in an XML form or in an ESC/POS form.

REFERENCE SIGNS LIST

1 . . . terminal device (print control device)
4 . . . communication network
5, 6 . . . printer (printing apparatus)
10 . . . terminal control unit (control unit, controller)
12 . . . driver executing unit (executor)
19 . . . printer information (data format information)
23 . . . communication interface (communication unit)
100, 101 . . . print system

The invention claimed is:

1. A print control device comprising:
a communicator configured to communicate with a printing apparatus, and
a controller configured to request the printing apparatus to communicate using a specific communication port via the communicator and determine a data form for the printing apparatus based on whether the printing apparatus responds to the request, the data form including a first data form and a second data form,
wherein when the controller determines that the printing apparatus does not respond to the request,
(i) the controller determines that the printing apparatus is a first printing apparatus which does not include a print server configured to convert the second data form to the first data form and conforms to the first data form, and
(ii) the controller communicates with the printing apparatus via the communicator using the first data form, and
when the controller determines that the printing apparatus responds to the request,
(i) the controller determines that the printing apparatus is a second printing apparatus which includes the print server and conforms to the first data form and the second data form, and
(ii) the controller communicates with the printing apparatus via the communicator using either one of the first data form and the second data form.

2. The print control device according to claim 1, wherein the controller transmits data for requesting printing apparatus information on the printing apparatus to the printing apparatus in the first data form when a response is received from the printing apparatus after the printing apparatus is requested to communicate using the specific communication port via the communicator.

3. The print control device according to claim 2, wherein the controller determines that the data form applicable to the printing apparatus is the first data form when the printing apparatus information is received from the printing apparatus in response to the request, and determines that the data form applicable to the printing apparatus is the second data form when the printing apparatus information is not received from the printing apparatus.

4. The print control device according to claim 1, wherein the controller determines that the data form applicable to the printing apparatus is the first data form when a response is not received from the printing apparatus after the printing apparatus is requested to communicate using the specific communication port via the communicator.

5. The print control device according to claim 1, wherein the controller transmits print data to the printing apparatus using data suitable for the data form applicable to the printing apparatus to perform a printing operation.

6. The print control device according to claim 1, wherein the communicator accesses a communication network to which a plurality of the printing apparatuses are able to be connected, and
the controller searches the printing apparatuses connected to the communication network via the communicator and requests the searched printing apparatuses to communicate using the specific communication port.

7. The print control device according to claim 6, wherein the controller determines which of the first data form and the second data form is applicable to the printing apparatus and generates data format information in which (i) a result of the determination of which of the first data form and the second data form is applicable to the printing apparatus and (ii) the printing apparatus are correlated with each other.

8. A print system comprising:
a printing apparatus which is one of:
a first printing apparatus that is configured to perform a printing operation based on print data, does not include a print server configured to convert the second data form to a first data form and conforms to the first data form; and
a second printing apparatus that is configured to perform a printing operation based on print data, includes a print server and conforms to the first data form and the second data form; and
a print control device configured to include:
a communicator configured to communicate with the printing apparatus; and
a controller configured to request, via the communicator, that the printing apparatus use a specific communication port to communicate and determine a data form for the printing apparatus based on whether the printing apparatus respond to the request, the data form including the first data form and the second data form, wherein when the controller determines that the printing apparatus responds to the request, (i) the controller determines that the printing apparatus is the second printing apparatus, and (ii) the controller communicate with the printing apparatus via the communicator using the first data form or the second data form, when the controller determines that the printing apparatus does not respond to the request, (i) the controller determines that the printing apparatus is the first printing apparatus, and (ii) the controller communicates with the printing apparatus via the communicator using the first data form.

9. A print control method of a printing apparatus comprising:

requesting that the printing apparatus use a specific communication port to communicate;

determining a data form for the printing apparatus based on whether the printing apparatus responds to the request, the data form including a first data form and a second data form;

(i) determining that the printing apparatus is a first printing apparatus which does not include a print server configured to convert the second data form to the first data form and conforms to the first data form when the printing apparatus does not respond to the request, and (ii) determining that the printing apparatus is a second printing apparatus which includes a print server and conforms to the first data form and the second data form when the printing apparatus responds to the request; and (i) performing communication with the printing apparatus using the first data form when the printing apparatus is determined as the first printing apparatus, and (ii) performing communication with the printing apparatus using the first data form or the second data form when the printing apparatus is determined as the second printing apparatus.

10. The print control method according to claim 9, wherein data for requesting printing apparatus information on the printing apparatus is transmitted to the printing apparatus in a first data form when a response is received from the printing apparatus after the printing apparatus is requested to communicate using the specific communication port.

11. The print control method according to claim 10, wherein it is determined that the data form applicable to the printing apparatus is the first data form when the printing apparatus information is received from the printing apparatus in response to the request, and it is determined that the data form applicable to the printing apparatus is a second data form when the printing apparatus information is not received from the printing apparatus.

12. The print control method according to claim 9, wherein it is determined that the data form applicable to the printing apparatus is the first data form when a response is not received from the printing apparatus after the printing apparatus is requested to communicate using the specific communication port.

13. The print control method according to claim 9, wherein print data is transmitted to the printing apparatus using data suitable for the data form applicable to the printing apparatus to perform a printing operation.

14. The print control method according to claim 9, wherein a communication network to which a plurality of the printing apparatuses are able to be connected is accessed, and the printing apparatuses connected to the communication network are searched and the searched printing apparatuses are requested to communicate using the specific communication port.

15. The print control method according to claim 9, wherein data format information in which the determined data form and the printing apparatus are correlated with each other is generated.

* * * * *